US010746949B2

(12) United States Patent
Bryon et al.

(10) Patent No.: US 10,746,949 B2
(45) Date of Patent: Aug. 18, 2020

(54) OPTICAL FIBER MANAGEMENT SYSTEMS; AND METHODS

(71) Applicant: COMMSCOPE CONNECTIVITY BELGIUM BVBA, Kessel-Lo (BE)

(72) Inventors: Roel Modest Willy Bryon, Hickory, NC (US); Kristof Vastmans, Hickory, NC (US); Stefano Beri, Hickory, NC (US)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/465,657

(22) PCT Filed: Dec. 1, 2017

(86) PCT No.: PCT/EP2017/081180
§ 371 (c)(1),
(2) Date: May 31, 2019

(87) PCT Pub. No.: WO2018/100153
PCT Pub. Date: Jun. 7, 2018

(65) Prior Publication Data
US 2020/0026018 A1   Jan. 23, 2020

Related U.S. Application Data

(60) Provisional application No. 62/429,390, filed on Dec. 2, 2016, provisional application No. 62/484,625, filed on Apr. 12, 2017.

(51) Int. Cl.
*G02B 6/44* (2006.01)
*G02B 6/255* (2006.01)

(52) U.S. Cl.
CPC ........... *G02B 6/4458* (2013.01); *G02B 6/255* (2013.01); *G02B 6/4454* (2013.01); *G02B 6/4478* (2013.01)

(58) Field of Classification Search
CPC .... G02B 6/4458; G02B 6/255; G02B 6/4454; G02B 6/4478; G02B 6/2551;
(Continued)

(56) References Cited

U.S. PATENT DOCUMENTS 5,353,366 A   10/1994   Bossard
5,997,186 A   12/1999   Huynh et al.
(Continued)

FOREIGN PATENT DOCUMENTS

GB      2 298 496 A    9/1996
WO    2015/062645 A1   5/2015
(Continued)

OTHER PUBLICATIONS

International Search Report and Written Opinion of the International Searching Authority for International Patent Application No. PCT/EP2017/081180 dated Jul. 17, 2018, 21 pages.

*Primary Examiner* — Ryan A Lepisto
(74) *Attorney, Agent, or Firm* — Merchant & Gould P.C.

(57) ABSTRACT

Aspects and techniques of the present disclosure relate to handheld tools for assisting in routing optical fiber, and including advantageous features and methods usable with handheld tools. Disclosed features and techniques relate to: a splicing station, a spool, a groove plate; a substrate; a fiber management device; a tool; and flexible organizers.

28 Claims, 10 Drawing Sheets

(58) Field of Classification Search
CPC .. G02B 6/2553; G02B 6/4457; G02B 6/4455; G02B 6/4439; G02B 6/444; G02B 6/4452; G02B 6/4453; G02B 6/4471
See application file for complete search history.

(56) References Cited

U.S. PATENT DOCUMENTS

| | | | |
|---|---|---|---|
| 6,322,019 | B1 | 11/2001 | Talamini, Sr. |
| 7,031,588 | B2 | 4/2006 | Cowley et al. |
| 7,113,686 | B2 | 9/2006 | Bellekens et al. |
| 7,200,314 | B2 | 4/2007 | Womack et al. |
| 7,447,412 | B2 | 11/2008 | Bellekens et al. |
| 7,769,265 | B2 * | 8/2010 | Cairns .................. B65H 55/04 242/129.5 |
| 7,936,960 | B2 | 5/2011 | McGranahan |
| 2002/0181923 | A1 | 12/2002 | Wojcik |
| 2004/0161212 | A1 | 8/2004 | Sun et al. |
| 2010/0247049 | A1 | 9/2010 | Izuhara et al. |
| 2016/0161695 | A1 | 6/2016 | Allen et al. |

FOREIGN PATENT DOCUMENTS

| | | | | |
|---|---|---|---|---|
| WO | WO-2016078712 | A1 * | 5/2016 | ........... G02B 6/3897 |
| WO | 2018/037078 | A1 | 3/2018 | |

* cited by examiner

OPTICAL FIBER MANAGEMENT SYSTEMS; AND METHODS

CROSS-REFERENCE TO RELATED APPLICATIONS

This application is a National Stage Application of PCT/EP2017/081180, filed on Dec. 1, 2017, which claims the benefit of U.S. Patent Application Ser. No. 62/429,390, filed on Dec. 2, 2016, and claims the benefit of U.S. Patent Application Ser. No. 62/484,625, filed on Apr. 12, 2017, the disclosures of which are incorporated herein by reference in their entireties. To the extent appropriate, a claim of priority is made to each of the above disclosed applications.

TECHNICAL FIELD

The present disclosure relates generally to telecommunications management devices. More specifically, the present disclosure relates to systems for managing optical fibers.

BACKGROUND

Trays are commonly used to manage, store and protect optical fibers and optical splices. Trays typically have relatively hard, plastic constructions and include integrated structures defining fiber routing paths and splice storage locations. The fiber routing paths are defined by integrated fiber guide structures shaped and configured for preventing optical fiber bend radius requirements from being violated during fiber routing. Trays are commonly used to manage optical fiber within closures and at other locations where space is of a premium. Unfortunately, the bulky and generally rigid nature of traditional trays requires the trays to occupy a relatively large amount of space.

SUMMARY

Certain aspects of the present disclosure relate to a system for facilitating routing and splicing optical fibers.

Aspects of the present disclosure relates to a structure that has both optical fiber management and splicing functionality that can be used in combination with a substrate. Various types of splicing can be used to splice single fibers or multi-fibers, for example, mechanical splices, fusion splices, etc.

The structure provides a routing path for routing optical fibers onto the substrate that can be temporarily supported by, mounted on or attached to the structure. The structure can accommodate spliced fibers that are in a multi-fiber (e.g., ribbon) configuration or a single fiber configuration.

Typically, the structures or tools for managing and splicing optical fibers tend to be relatively bulky and rigid. Thus, there are benefits to separating the structure from the substrate that holds and stores the optical fibers. In one example, the substrate is optionally flexible and may optionally include adhesive for retaining optical fibers along a desired fiber routing path once the optical fibers have been routed. The structure is preferably removable/detachable from the substrate after splicing and fiber routing has taken place. This allows the substrate to be small (e.g., thin) and flexible and easy to manage. In this way, fibers can be routed in a manner similar to a standard tray, and after routing, the bulky fiber routing structure can be removed with the fibers being retained in the routed arrangement by the less bulky substrate.

Thus, systems in accordance with the present disclosure can have the benefit of easy fiber routing associated with standard fiber management trays, without the bulk thereby resulting in space savings. In an optional example, the structure can also temporarily interface with a base (e.g., a groove plate or other structure) for organizing or grouping the substrates.

Another aspect of the present disclosure relates to an optical fiber management system. The system can include a substrate for managing an optical fiber and a tool with a splicing station for facilitating splicing and routing the optical fiber along a desired routing path on the substrate. The tool can be used in combination with the substrate and then removed from the substrate. The substrate itself is compact and less bulky than the tool.

One aspect of the present disclosure relates to an optical fiber management system. The system can include a substrate for managing an optical fiber and a tool for assisting in routing the optical fiber along a desired routing path on the substrate. The tool can be removable from the substrate. The substrate can include structure for holding/maintaining the optical fiber along the desired routing path after the tool has been removed. The substrate itself and the structure on the substrate for holding/maintaining the optical fiber along the desired routing path preferably are compact and less bulky than the tool. In a preferred example, the structure for holding/maintaining the optical fiber along the tool defined fiber routing path after removal of the tool from the substrate includes an adhesive layer.

Another aspect of the present disclosure relates to a fiber management device. The fiber management device can include a base that has substrate attachment locations and fiber management substrates that attach to the substrate attachment locations of the base. The fiber management substrates can have flexible constructions that allow the substrates to flex through a range of movement relative to the base that includes at least 45 degrees. In one example, the base can include a groove plate. However, it will be appreciated that the base is not limited to a groove plate type configuration and can also include other structures and/or configurations adapted for mounting or organizing the fiber management substrates in a grouped configuration.

A further aspect of the present disclosure relates to a method of storing optical fiber in an optical fiber management system. The method includes the steps of: attaching a tool to a groove plate, the tool can be adapted to facilitate routing an optical fiber about a desired routing path; adhering the optical fiber to a substrate positioned on the tool; inserting the substrate into a substrate mounting location defined by the groove plate; and removing the tool from the groove plate such that the substrate including the optical fiber remains mounted within the substrate mounting location.

Another aspect of the present disclosure relates to a method of using a tool assisted tray for storing optical fiber. The method can include the step of inserting a spool into a cut-out portion defined by the tool. The tool can include a tray member with a fiber containment wall. The method can include the step of inserting a bottom substrate layer onto the tray of the tool. The bottom substrate layer can define an opening to receive the spool upon insertion. The bottom substrate layer has a first surface and an opposite second surface where the second surface of the bottom substrate layer contacts the tray. The method further includes the steps of routing ends of an optical fiber through a groove plate; and routing excess fiber around the spool and onto the first surface of the bottom substrate layer. The first surface can have an adhesive applied thereon for securing the optical fiber. The method includes the steps of joining a top substrate layer to the bottom substrate layer such that the optical fiber is sandwiched between the bottom and top substrate layers; and mounting the bottom and top substrate layers together on the groove panel using the tool. The method includes the step of removing the tool from groove plate once the bottom and top substrate layers are attached to the groove plate.

The various aspects characterized above in this section can be used together or separately in enclosure arrangements.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
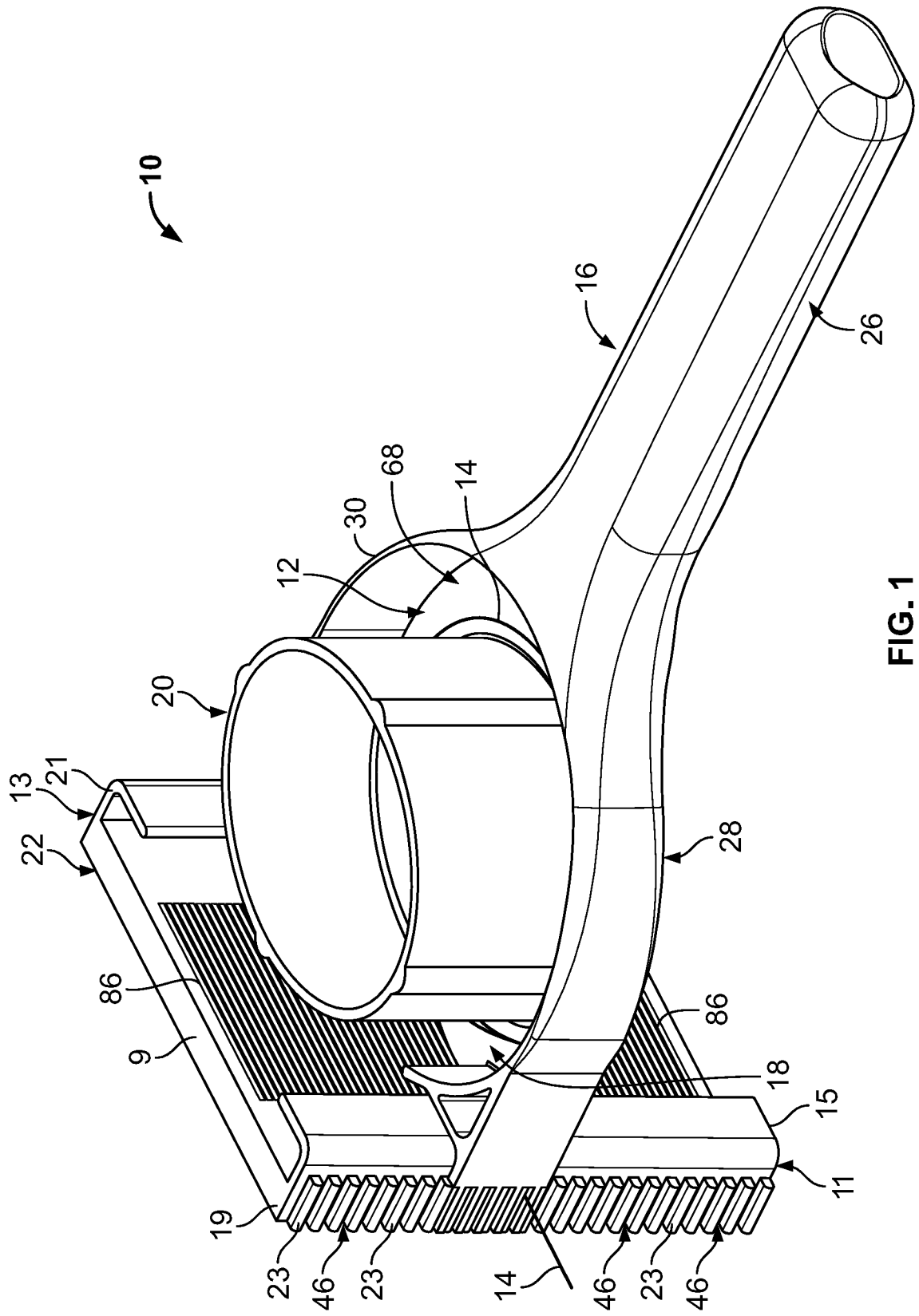
FIG. 1 is a schematic perspective view of an example optical fiber management system showing a first example tool in accord with selected principles of the present disclosure.

Reference will now be made in detail to the exemplary aspects of the present disclosure that are illustrated in the accompanying drawings. Wherever possible, the same reference numbers will be used throughout the drawings to refer to the same or like structure.

The present disclosure relates to an advantageous example optical fiber management system adapted to be used within a telecommunications enclosure, closure, box, cabinet, terminal, or at any other location where fiber management is desirable. The example optical fiber management system can include a removable tool for facilitating or guiding routing optical fiber along a desired routing path and for facilitating applying the routed optical fiber to a substrate.

In certain examples, the removable tool can include an optical splice arrangement that has a splicing station for facilitating splicing together first and second optical fibers. In one example, the splicing station can facilitate mechanical splicing, although alternatives are possible. For example, the splicing station can facilitate fusion splicing.

The removable tool includes structure for managing optical fibers and for facilitating guiding optical fiber along a desired routing path either before or after the splice. The tool can accommodate multiple fibers that are spliced in either a ribbon configuration or single fiber configuration. The tool can be used for loading the routed optical fiber onto a lightweight, flexible substrate. The tool can be generally rigid in comparison to the substrate. The tool can be removed from the substrate after loading the routed fiber.

The advantageous optical fiber management system provides for a flexible, less bulky, arrangement for storing optical fibers. The advantageous optical fiber management system can increase the density and connectivity within an equipment enclosure. The advantageous optical fiber management system provides for the capability of splicing in the field.

It should be appreciated that, throughout the figures, the splicing station can accommodate a single fiber to single fiber splice or a multi-fiber to multi-fiber splice; likewise, the first optical fiber can represent a single fiber or a first set of a plurality of first optical fibers; and the second optical fiber can represent a second fiber or a second set of a plurality of second optical fibers. Thus, optical splices can include single fiber splices and multi-fiber splices (e.g., mass fusion splices).

In a common fusion splicing operation, two optical fibers or two sets of optical fibers are first co-axially aligned. The splicing station can include mechanical alignment features (e.g., v-grooves or other structures) for co-axially aligning the optical fibers. The splicing station may alternatively include structure for actively aligning the optical fibers. Once the optical fibers have been aligned, the ends of the optical fibers can be fusion spliced together usually by an electric arc. The splicing station can include electrodes for generating a plasma arc, lasers, or other energy sources for fusing the ends of the optical fibers together. After splicing, the splice location is typically reinforced with a fiber optic fusion splice protector (e.g., a heat shrink sleeve that may include a relatively rigid reinforcing rod or other member) that may be used to protect the fusion splice. In other examples, the splicing station may include a recoat station such that the fusion splices can be protected by a re-coat process (e.g., a polymeric layer such as acrylate that may be overmolded or otherwise applied over the fusion splice location).

The splicing station can also be configured to facilitate mechanical splicing together optical fibers. In certain examples, mechanical splice devices/packages including splice housings can be used. A splice housing can include an internal mechanical fiber alignment feature (e.g., a groove, slot, micro-bore, etc.). In certain examples, the splice housing can contain an adhesive that fixes the ends of the aligned optical fibers within the splice housing. Example adhesives include epoxy, light curable adhesive (e.g., ultraviolet light curable adhesive), thermo-form adhesive, thermo-set adhesive, index-matching adhesive or other adhesives.

FIG. 1 is a schematic perspective view of an example optical fiber management system 10. The optical fiber management system 10 can include a substrate 12 (e.g., fiber manager, fiber management substrates, sheets, films, liners, sleeves, envelopes, thin trays, etc.) for managing an optical fiber 14 thereon or therein and a tool 16 (e.g., handheld tool, a tray-like tool, a fiber routing tool, a fiber guiding tool, etc.) to help facilitate routing and splicing of the optical fiber 14 along a desired routing path 18 and to help facilitate applying the optical fiber 14 to the substrate 12. The tool 16 may also include a spool 20 about which the optical fiber 14 can be coiled for storing excess fiber length. The optical fiber management system 10 can further include a groove plate 22 (e.g., base, panel, substrate manager, substrate organizer). The tool 16 is arranged and configured to be removable from the substrate 12 once the substrate 12 is mounted to the groove plate 22.

Figure 2:
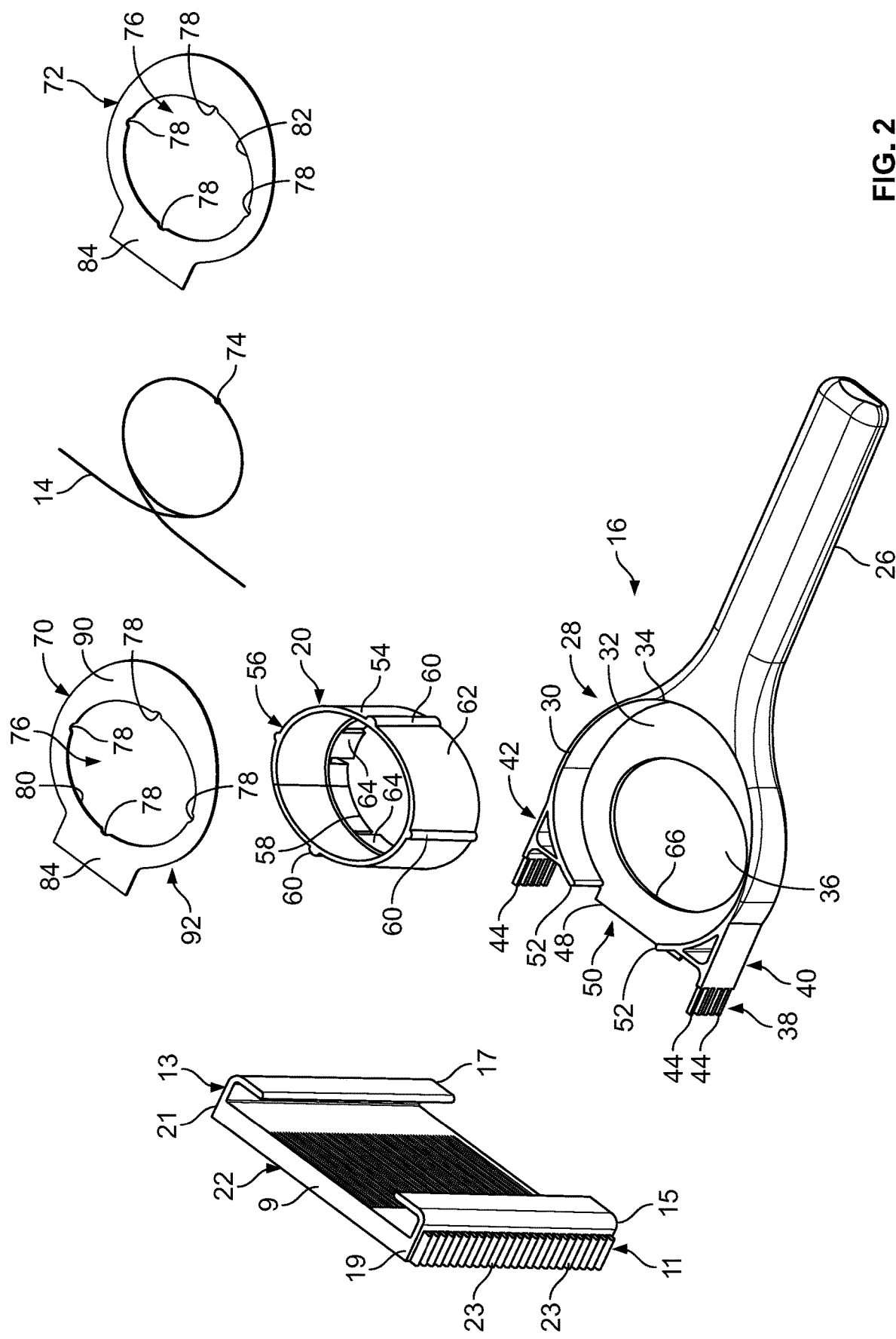
FIG. 2 is an exploded view of the optical fiber management system shown in FIG. 1 depicting substrates in accord with selected principles of the present disclosure.

Referring to FIG. 2, an exploded view of the example optical fiber management system 10 is depicted. The example tool 16 can include a handle member 26 and a tray member 28 (e.g., fiber management structure). The handle member 26 extends from the tray member 28. The tray member 28 can include a fiber containment wall 30 for containing and spooling the optical fiber 14. In certain examples, the tray member 28 may include more than one fiber containment wall 30. The fiber containment wall 30 can help to provide a desired routing path for the optical fiber 14 arranged on the tray member 28. The tray member 28 includes a substrate support surface 32 for supporting the substrate 12 during fiber routing. In the example depicted, the fiber containment wall 30 extends upwardly around a periphery 34 of the substrate support surface 32. In other examples, there may be more than one fiber containment wall 30 positioned on the tray member 28.

The tray member 28 of the tool 16 may define a cut-out portion 36 in the substrate support surface 32. The cut-out portion 36 can take the shape of a cylinder, a race-track, an oval, an ellipse, and/or an obround, although alternatives are possible. The example tool 16 is arranged and configured to couple to the groove plate 22 by a detachable mechanical coupling interface 38 (e.g., a snap-fit, interference fit, press-fit, etc.) positioned on opposing first and second sides 40, 42 of the tray member 28. The tool 16 is movable between an engaged position and a disengaged position relative to the groove plate 22. The tool 16, when in the engaged position (see FIG. 1), is arranged and adapted to be mounted on the groove plate 22. An advantageous feature of such a design is a hands free tool 12 that is supported by the groove plate 72 during splicing and/or fiber routing.

In one example, the detachable mechanical coupling interface 38 of the tool 16 can include one or more extended latching finger 44 that are shaped to be inserted through one or more slots 46 (see FIG. 1) defined by the groove plate 22.

In the example depicted, a plurality of extended latching fingers 44 are arranged and configured to be inserted into a plurality of slots 46 in the groove plate 22, although alternatives are possible. When in the disengaged positioned, the tool 16 can be removed from the substrate 12 while the substrate 12 remains secured to the groove plate 22 in a manner that does not prevent the tool 16 from being removed.

The groove plate 22 can include a main body 9, a left-side panel 11 and the right-side panel 13, having lower ends 15, 17, (see FIG. 2) respectively, and upper ends 19, 21, respectively. The main body 9 is rectangular, extending between the left and right side panels 11, 13. Each side panel 11, 13 can include horizontal ribs 23 that define the plurality of slots 46. The horizontal ribs 23 can be arranged and configured from the upper ends 19, 21 of each respective side panel 11, 13 toward the lower ends 15, 17 of each respective side panel 11, 13. The plurality of slots 46 each defines a useable depth for receiving the latching fingers 44 of the tool 16. Each one of the plurality of slots 46 in the left-side panel 11 can have a matched slot in the right-side panel 13, and vice versa, to form matched pairs of slots. The matched pairs of the plurality of slots 46 can run parallel to each other, and preferably are symmetrically located in the groove plate 22.

The tray member 28 of the tool 16 can further include a projection tab 48.

The projection tab 48 extends from a portion of the substrate support surface 32 between an opening 50 defined by ends 52 of the fiber containment wall 30. The projection tab 48 can be generally positioned between the detachable mechanical coupling interface 38 of the tool 16. The projection tab 48 facilitates mounting of the substrate 12 to the groove plate 22, as will be explained in further detail below.

In one example, the handle member 26 and the tray member 28 can be integrally-monolithically formed together. For example, the handle member 26 and the tray member 28 can be unitarily molded and, according to some examples, are each unitarily injection molded, although alternatives are possible. In other examples, the handle member 26 and the tray member 28 can be coupled together such that the tray member 28 and the handle member 26 are configured as two separate pieces.

The tool 16 may be formed of any suitable rigid or semi-rigid material. According to some examples, the handle member 26 and the tray member 28 are formed of a polymeric material. According to some examples, the handle member 26 and the tray member 28 can formed of a polymeric material. According to some examples, the handle member 26 and the tray member 28 can be formed of a polymeric material, such as, polypropylene, polyethylene, nylon, ABS, PMMA, some other material or any combination thereof.

Still referring to FIG. 2, the spool 20 has a barrel 54 around which the optical fiber 14 is wound (e.g., coiled). The spool 20 need not be cylindrical in shape, and may be obround, elliptical, oval, circular, etc. The spool 20 may also have a race-track shape and a shape that has curved ends separated by spaces. It will be appreciated that the spool 20 can be any structure, such as, but not limited to, a bend radius limiter, about which a fiber can be coiled and includes a curved surface or surfaces for preventing minimum bend radius requirements of the optical fiber from being violated. In one example, the spool 20 may have a curved portion 56 that has a radius equal to or greater than a minimum bend radius of the optical fiber 14.

In one example, the spool 20 can be mounted on the tray member 28 of the tool 16. The spool 20 can be secured to the tray member 28 by a detachable connection 58, although alternatives are possible. For example, the spool 20 can be permanently secured to the tray member 28. In other examples, the spool 20 can be secured to the tray member 28 by a snap-fit connection. The spool 20 includes at least one longitudinal rib 60 that extends longitudinally along an exterior surface 62 of the barrel 54. In the example depicted, four longitudinal ribs 60 are shown.

The spool 20 includes spring clips 64 that each extend below a respective longitudinal rib 60. The tray member 28 can be engageable with the spring clips 64 to provide a connection between the spool 20 and the tray member 28, although alternative detachable connections are possible. In the example depicted, when the spool 20 is inserted through the cut-out portion 36 of the tray member 28, the spring clips 64 can flex inward during insertion and snap outward when the spring clips 64 passes an edge 66 of the cut-out portion 36 to secure the spool 20 within the cut-out portion 36 of the tray member 28.

In the example depicted, when the spool 20 is mounted to the tray member 28, the substrate support surface 32 surrounds the spool 20 such that the substrate support surface 32 is positioned between the spool 20 and the fiber containment wall 30. In one example, the optical fiber 14 is routed in a fiber routing region 68 (see FIG. 1) defined between the spool 20 and the fiber containment wall 30 of the tray member 28.

Still referring to FIG. 2, the substrate 12 has a flexible construction, although alternatives are possible. For example, the substrate 12 may have a rigid construction. The substrate 12 has an inherent flexibility that allows the substrate to be flexed like a living hinge. In one example, the substrate 12 includes a flexible sheet. In certain examples, the substrate 12 includes a flexible polymeric sheet.

Aspects of the present disclosure relate to the substrate 12 having a flexibility that flexes up to but not beyond a minimum bend radius of an optical fiber intended to be managed. In one example, the optical fiber is a G657A or G652D optical fiber. In one example, a plurality of different types of optical fibers are intended to be managed by the substrate 12, and the minimum bend radius beyond which the substrate 12 does not flex corresponds to the minimum bend radius of the optical fiber having the highest minimum bend radius of the plurality of optical fibers (i.e., the manger can be designed for the worse-case scenario). Preferably, the substrate 12 does not break or kink to ensure the safety and protection of the optical fibers. In certain examples, the substrate 12 is bendable in such a way that the optical fiber bend radius requirements are respected and satisfied.

In other examples, the substrate 12 may have a flexibility that allows the substrate 12 to flex along a bend smaller than a minimum bend radius of the optical fiber or fibers being managed.

In certain examples, the substrate 12 has a construction that allows the substrate 12 to be flexed more than a standard tray, but prevents the substrate 12 from being bent along a curvature having a radius smaller than a minimum bend radius of the optical fiber intended to be managed on the substrate 12. In certain examples, the substrate 12 has a construction that allows it to be bent along a curvature having a radius smaller than 10 centimeters (cm), or 8 cm, or 6 cm, or 5 cm, or 4 cm, or 3 cm or 2 cm without breaking or kinking, and optionally prevents the substrate 12 from being bent along a curvature having a radius smaller than a minimum bend radius of the optical fiber intended to be managed on the substrate 12. The tool 16 can be arranged and configured to have a more rigid and robust construction than the substrate 12.

Figure 3:
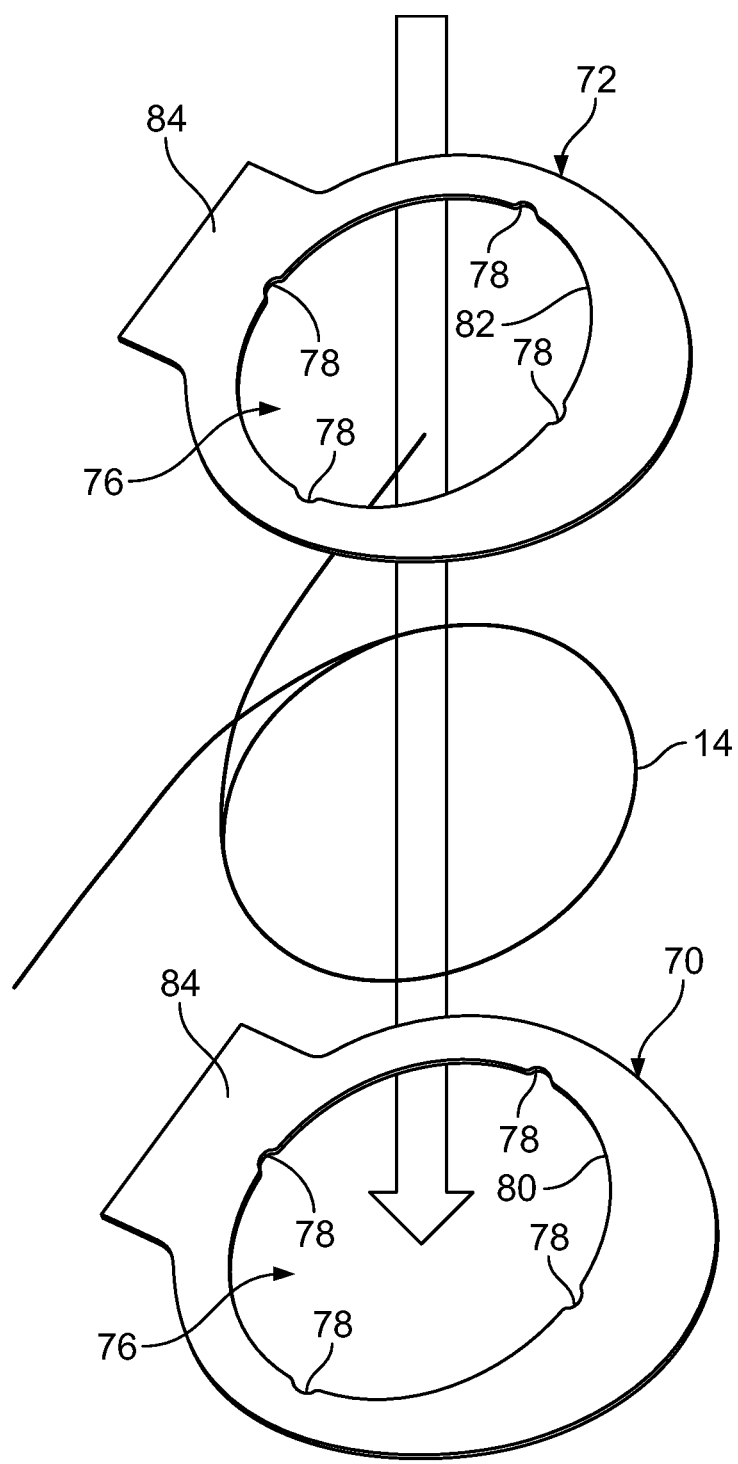
FIG. 3 is a schematic view showing an assembly of the substrates shown in FIG. 2 in accord with selected principles of the present disclosure.
Figure 4:
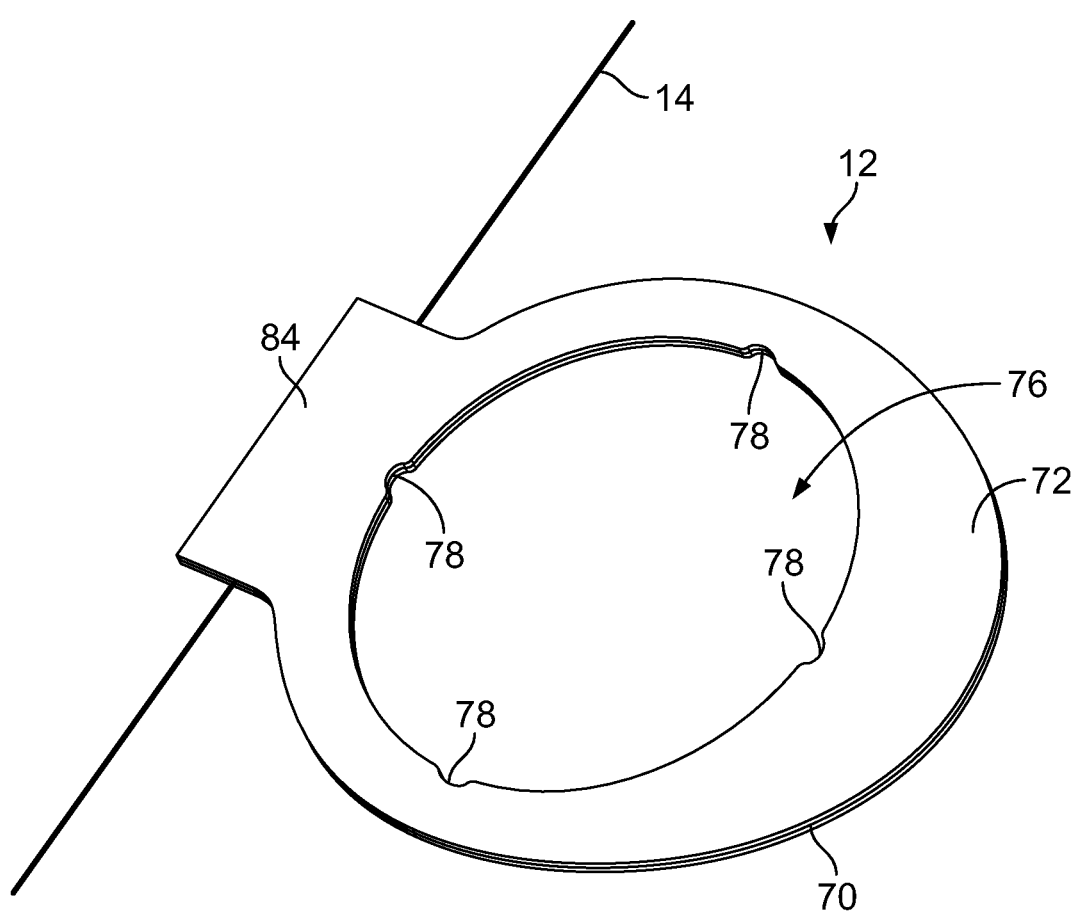
FIG. 4 is a schematic view of the substrates shown in FIG. 3 assembled together.

In the example depicted, the substrate 12 includes a bottom substrate layer 70 (e.g., first substrate) and a top substrate layer 72 (e.g., second substrate). The bottom substrate layer 70 can include an adhesive layer thereon for holding the routed optical fiber 14 on the bottom substrate layer 70. As depicted in FIGS. 3-4, the top substrate layer 72 can be affixed to the bottom substrate layer 70 via the adhesive layer such that the routed optical fiber 14 can be secured between the bottom and top substrate layers 70, 72.

The routed optical fiber 14 can include excess fiber length that can be stored (e.g., in a coiled configuration) for use in later optical splicing. For example, a portion of the optical fiber 14 routed and managed on the bottom substrate layer 70 can be routed to an optical splice location 74 (see FIG. 2). As such, the substrate can be used to manage spliced optical fibers 14. The substrate 12 can assists in storing/managing the optical fibers 14 on the tray member 28 and in protecting the optical splice location 74.

It will be appreciated that the optical splice 74 can be a fusion splice or a mechanical splice. In certain examples, a fusion splice can be protected by a re-coat process. In other examples, a mechanical splice can include a miniature slice with a splice housing that provides mechanical alignment of the optical fibers 14 (e.g., via alignment grooves and/or flexible cantilevers) and adhesive for anchoring the optical fibers 14 in the splice housing. Example splice configurations are disclosed at PCT Patent Application Serial No. PCT/EP2017071330, which is hereby incorporated by reference in its entirety.

The adhesive layer can be a pressure sensitive adhesive that has a bond strength strong enough to hold the bottom and top substrate layers 70, 72 together during storage of the optical fiber 14. The adhesive layer is also weak enough to allow the bottom and top substrate layers 70, 72 to be pulled apart to allow the routed optical fiber 14 to be accessed. Thus, the chemical bond between the bottom and top substrate layers 70, 72 retains the optical fiber 14 within the substrate 12 until such time as a user wishes to peal the top substrate layer 72 away from the bottom substrate layer 70.

In the example depicted, the bottom and top substrate layers 70, 72 of the substrate 12 each defines an opening 76 extending through the substrate 20 for receiving the spool 20 such that the spool 20 can be removed from the substrate 12 after routing the optical fiber 14. When the bottom and top substrates layers 70, 72 are inserted into the tool 16, the opening 76 is adjacent the cut-out portion 36 of the tray member 28 of the tool 16. The bottom and top substrate layers 70, 72 each includes notches 78 defined in respective inner surfaces 80, 82. The notches 78 are arranged and configured to align with the longitudinal ribs 60 of the spool 20 as the bottom and top substrate layers 70, 72 are aligned and attached together and inserted over the spool 20 and into the tray member 28 of the tool 16.

In the example depicted, the bottom and top substrate layers 70, 72 each include a tab member 84 that interface with the groove plate 22. The tab member 84 can be flexible, arranged and configured to align with the projection tab 48 when the bottom and top substrate layers 70, 72 are aligned or attached together and inserted onto the tray member 28 of the tool 16. The projection tab 48 facilitates mounting of the tab member 84 of the bottom and top substrate layers 70, 72 to the groove plate 22. For example, the substrate 12 can be securely coupled to the groove plate 22 via substrate mounting locations 86 (e.g., hollow interiors) defined in the main body 9, although alternatives are possible. The tab member 84 can be configured to fit within the substrate mounting locations 86. A plurality of substrates 12 can be added in this manner to the groove plate 22 to form a stacked assembly of the substrates 12.

Turning again to FIG. 1, the groove plate 22 can be arranged and configured with grooves for routing the optical fibers 14 to different spaced-apart substrate mounting locations 86. The optical fibers 14 may be routed on and off the groove plate 22 via any input/out paths. Once routed, any excess optical fiber can be taken up, spliced, and/or stored on the substrate 12. For example, excess fiber can be looped around the fiber routing region 68 that extends between the spool 20 and the fiber containment wall 30 of the tool 16.

The groove plate 22 defines a plurality of substrate mounting locations 86 for mounting the substrates 12 in a stacked/overlapping configuration. For example, the substrates 12 can be arranged on the groove plate 22 in a stacked arrangement. The substrates 12 can be coupled to the groove plate 22 in a pivoting stacked arrangement that facilitates access to the individual substrates 12 within the stack. The substrates 12 can have a flexible construction that provides the substrates 12 with inherent flexibility to allow the substrates 12 to flex/pivot in a living hinge-like manner. In certain examples, a plurality of substrates 12 can be mounted to the groove plate 22.

In one example, the substrates 12 can flex/pivot at least 45 degrees relative to the groove plate 22 to allow the substrates 12 to be individually accessed. In other examples, the substrates 12 can flex/pivot at least 90 degrees relative to the groove plate 22 to allow the substrates 12 to be individually accessed. In certain examples, the substrates 12 can flex/pivot at least 135 degrees relative to the groove plate 22 to allow the substrates 12 to be individually accessed. In still other examples, the substrates 12 can flex/pivot at least 180 degrees relative to the groove plate 22 to allow the substrates 12 to be individually accessed.

Figure 5:
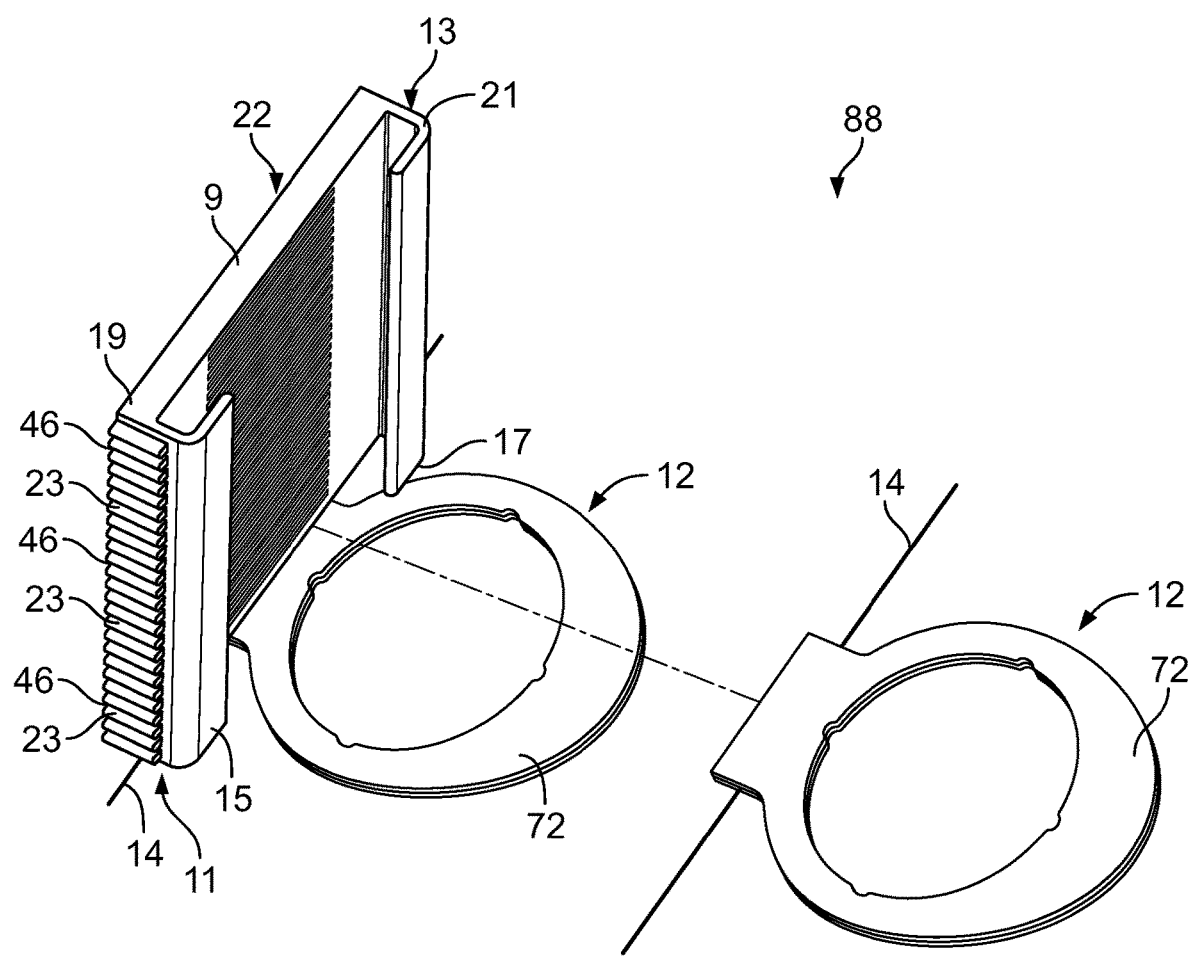
FIG. 5 is a schematic perspective view of a fiber management device in accord with selected principles of the present disclosure.

Referring to FIG. 5, an example fiber management device 88 is depicted. The fiber management device 88 is a component of the optical fiber management system 10 described above with reference to FIGS. 1-2. The example fiber management device 88 includes the groove plate 22 that defines the substrate mounting locations 86. The substrates 12 can be attached to the substrate mounting locations 86 of the groove plate 22. The substrates 22 have flexible constructions that allow the substrates 12 to flex/pivot through a range of movement relative to the groove plate 22. The substrate can flex/pivot at least 45 degrees relative to the groove plate 22, although alternatives are possible.

The present disclosure also relates to an example method of storing optical fiber 14 in the optical fiber management system 10. The example method includes the steps of: attaching the tool 16 to the groove plate 22 where the tool 16 is adapted to route the optical fiber 14 about the desired routing path 18; adhering the optical fiber 14 to the substrate 12 positioned on the tool 16; inserting the substrate 12 into the substrate mounting location 86 defined by the groove plate 22; and removing the tool 16 from the groove plate 22 such that the substrate 12 including the optical fiber 14 remains mounted within the substrate mounting location 86.

Another aspect of the present disclosure relates to an example method of using the tool 16 for storing the optical fiber 14. The method can include the step of inserting the spool 20 into the cut-out portion 36 defined by the tool 16. The tool 16 can include the tray member 28 with the fiber containment wall 30. The method can include the step of inserting a bottom substrate layer 70 onto the tray member 28 of the tool 16. The bottom substrate layer 70 defines the opening 76 to receive the spool 20 upon insertion. The bottom substrate layer 70 can have a first surface 90 (see FIG. 2) and an opposite second surface 92 (see FIG. 2) where the second surface 92 of the bottom substrate layer 70 contacts the tray member 28.

The method further includes the steps of routing ends of the optical fiber 14 through the groove plate 22 and routing excess fiber around the spool 20 and onto the first surface 90 of the bottom substrate layer 70. The first surface 90 can have an adhesive applied thereon for securing the optical fiber 14. The method includes the steps of joining the top substrate layer 72 to the bottom substrate layer 70 such that the optical fiber 14 is sandwiched between the bottom and top substrate layers 70, 72; and mounting the bottom and top substrate layers 70, 72 together on the groove plate 22 using the tool 16. The method includes the step of removing the tool 16 from groove plate 22 once the bottom and top substrate layers 70, 72 have been attached to the groove plate 22. Furthermore, the tool 16 can be removed from the groove plate 22 by removing the spool 20 from the tray member 28.

Figure 6:
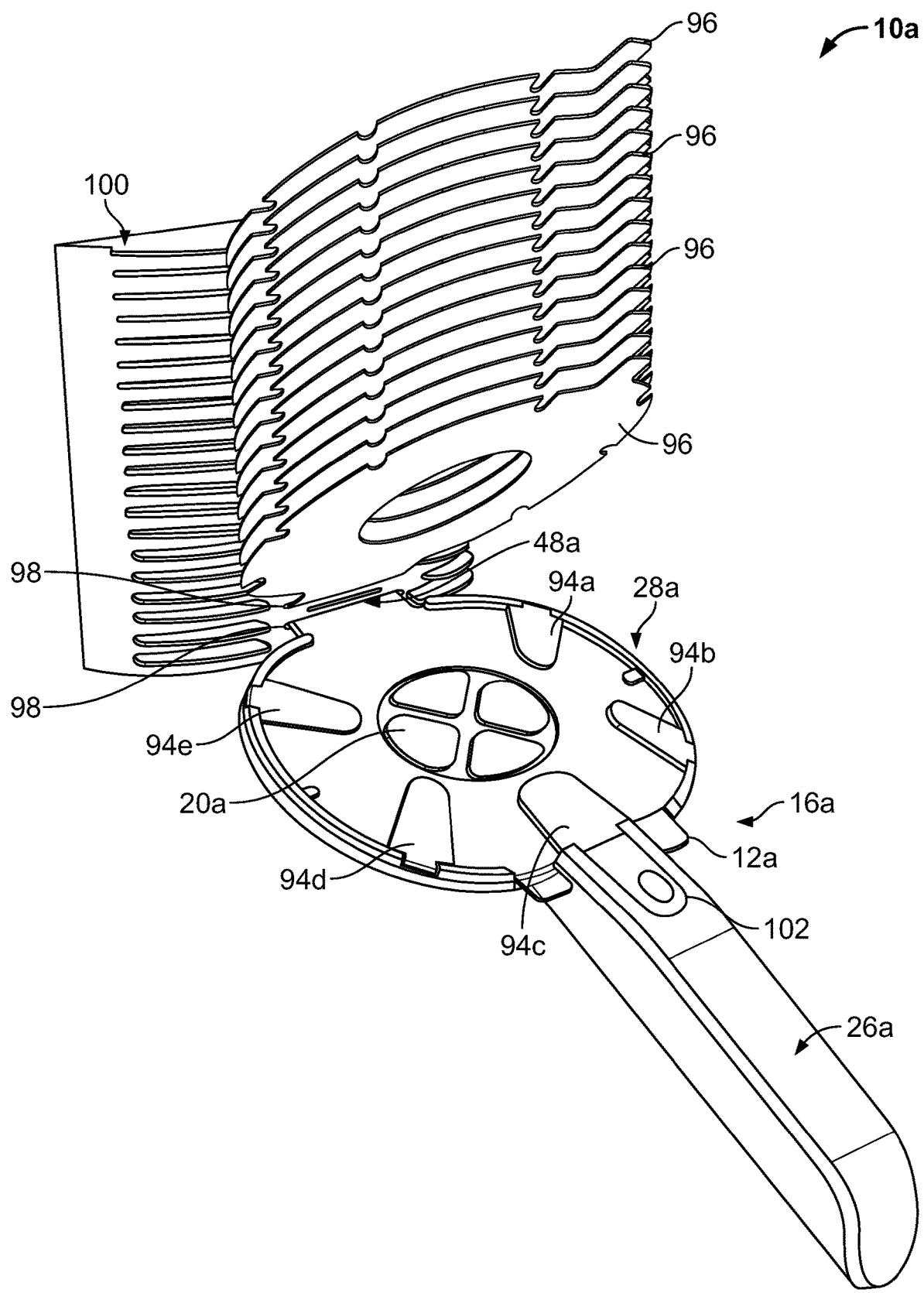
FIG. 6 is a schematic perspective view of another example optical fiber management system showing a second example tool in accord with selected principles of the present disclosure.

Referring to FIG. 6, depicts another example optical fiber management system 10a including a second example tool 16a (e.g., tool assisted tray) for routing optical fiber is depicted. Like reference numerals are used to indicate parts analogous to those described in previous examples. In the example depicted, the tool 16a includes a handle member 26a and a tray member 28a. The tray member 28a has a center spool 20a and a substrate 12a that can be attached to the tray member 28a. These components correspond to the respective components of the tool 16 described with reference to FIGS. 1-4 and will not be explained in detail again except where different.

The example tray member 28a includes a tab arrangement 94 including a plurality of tabs 94a-e that are arranged and configured about the tray member 28a. The tabs 94 can pivot up and down to allow insertion and removal of flexible organizers 96 (e.g., trays). The substrate 12a can be mounted onto the flexible organizers 96 positioned on the tray member 28a of the tool 16a. The flexible organizers 96 can each include a projection tab 48a that can be aligned with tab members 84a of the substrate 12a as described above with reference to FIG. 2-3 in order to mount the substrate 12a positioned on the flexible organizer 96 within one of a plurality of grooves 98 defined in a groove panel 100. Once the flexible organizer 96 is mounted, the tool 16a can be removed therefrom by raising or pivoting the tabs 94 up to disengage from the tray member 28a of the tool 16a. It will be appreciated that the tool 16a may be removed by alternative methods. In one example, the tool 16a may be arranged and configured with a quick release button 102 that causes the tabs 94 to be pivoted up together such that the tool 16a can be removed from the flexible organizer 96.

Figure 7:
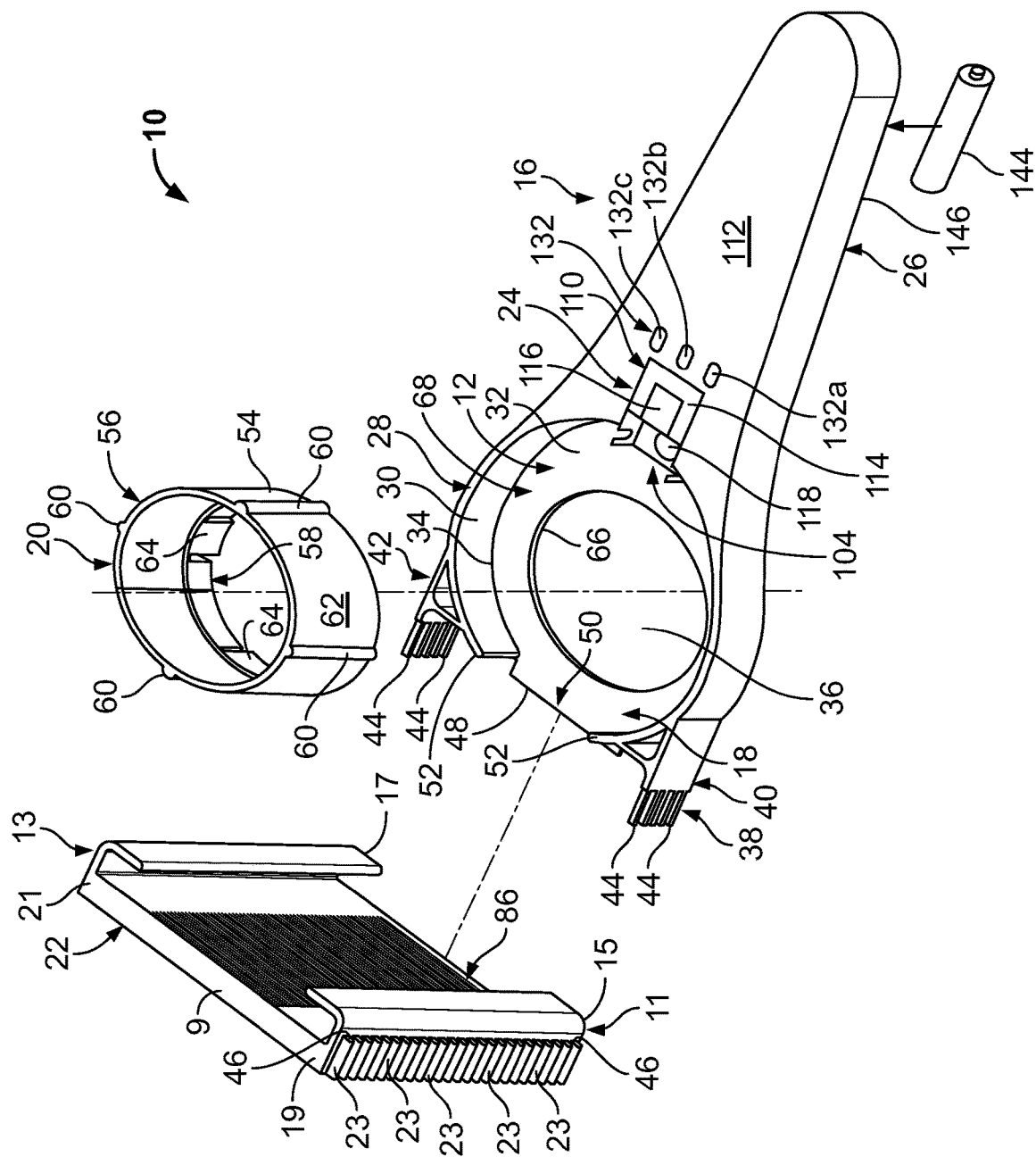
FIG. 7 is a schematic perspective view of the example tool including a splicing station in accord with selected principles of the present disclosure.

Referring to FIG. 7, the tool 16 can include a splicing station 24 for splicing together optical fibers (e.g., first and second optical fibers). The splice can include a single splice configuration or a multi-splice configuration. It will be appreciated that the tools in accordance with the present disclosure can include different types of splicing components to facilitate different types of splices (e.g., fusion splices, mechanical splices, etc.). The depicted tool 16 has structure for accommodating mechanical splicing. In other examples, structure for making a fusion splice or mass fusion splice may be used.

After fusion splicing, the splice location is typically reinforced with a fiber optic fusion splice protector (e.g., a mechanical splice protector) that may be used to protect the fusion splice. A common type of fiber optic fusion splice protector is a SMOUV fiber optic fusion splice protector sold by Commscope Inc. of Hickory, N.C., USA. This type of fusion splice protector includes an outer shrink-fit tube, a low temperature hot melt adhesive and a stainless steel or ceramic rod which functions to add rigidity to the protector and to reinforce the splice location.

In other examples, a recoat process may be used to recoat and protect the fusion splice, although alternatives are possible. In certain examples, the re-coat sections can have a diameter that is no more than 10% larger than a diameter of a normal coating of the optical fibers being spliced. In certain examples, the re-coat section can have an outer diameter that is equal to the outer diameter of the normal coating layers of the optical fibers.

The splicing station 24 can include an optical splice region 104 that is positioned along the fiber containment wall 30 of the tray member 28, although alternatives are possible. For example, the optical splice region 104 may be arranged and configured anywhere on the tool 16. The optical splice region 104 can be designed to receive an optical splice arrangement 106 (e.g., a mechanical splicing device or package) for splicing together optical fibers.

Figure 8:
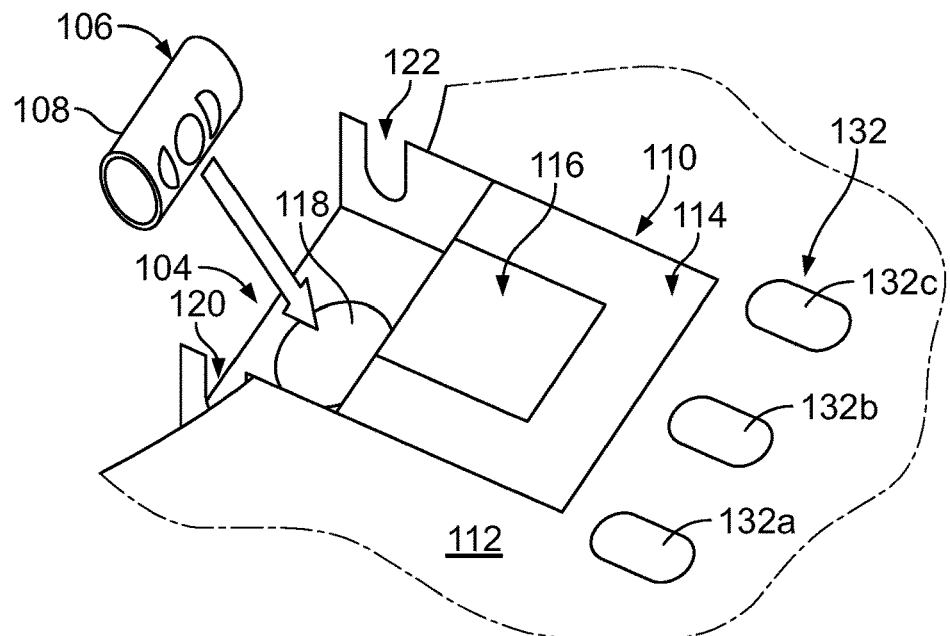
FIG. 8 is an enlarged view of a portion of the tool shown in FIG. 7.

FIG. 8 illustrates the optical splice arrangement 106 in accordance with the principles of the present disclosure. The optical splice arrangement 106 can form and support an optical splice between optical fibers (e.g., a first optical fiber and a second optical fiber). In certain examples, the optical splice arrangement 106 includes a splice housing 108 that either houses or includes features for mechanically co-axially aligning the ends of the optical fibers.

Figure 11:
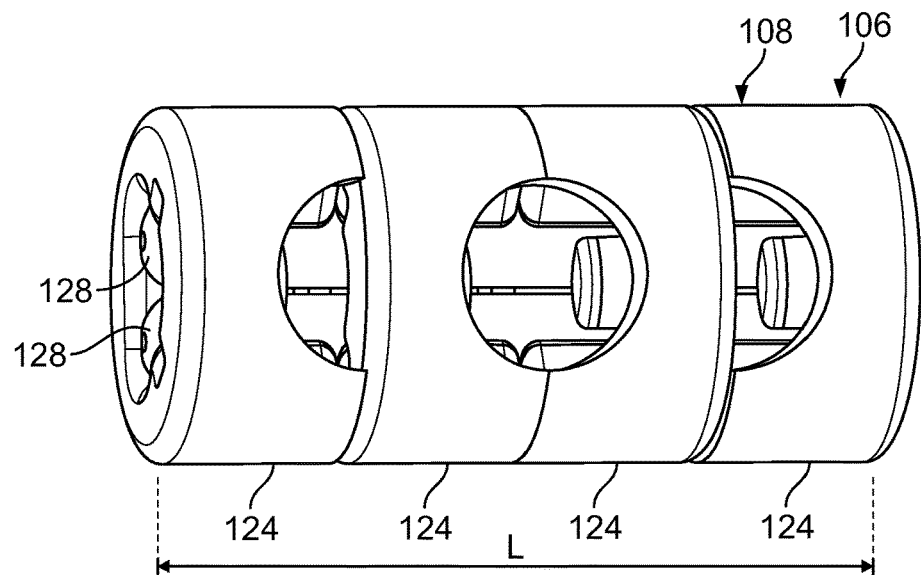
FIG. 11 shows an optical splice arrangement in accordance with the principles of the present disclosure, the optical splice arrangement includes a splice housing containing rods defining an alignment groove for aligning optical fibers desired to be optically spliced together, the splice housing also includes integral flexible cantilevers for depressing optical fibers into the alignment groove.
Figure 12:
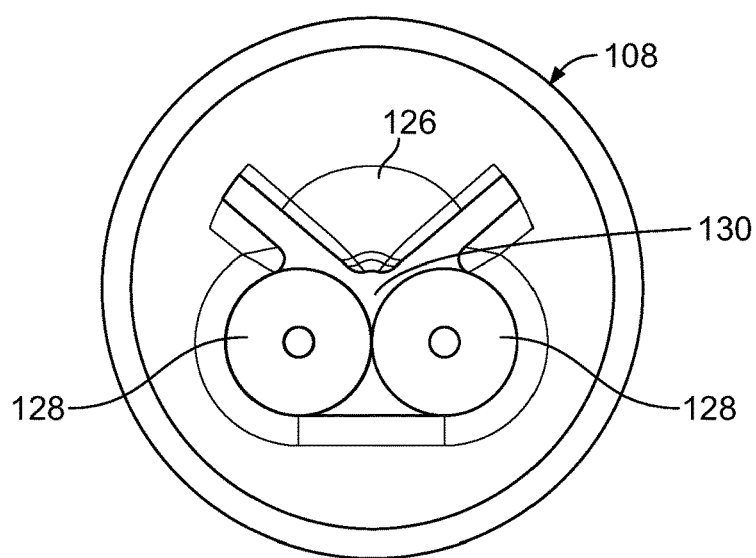
FIG. 12 is an end view of the optical splice arrangement of FIG. 11.
Figure 13:
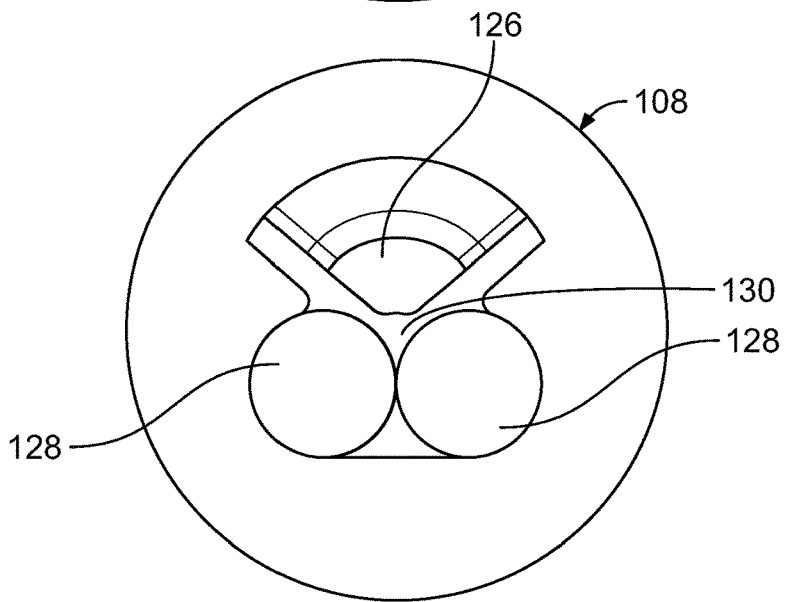
FIG. 13 is a cross-sectional view of the optical splice arrangement of FIG. 11.
Figure 14:
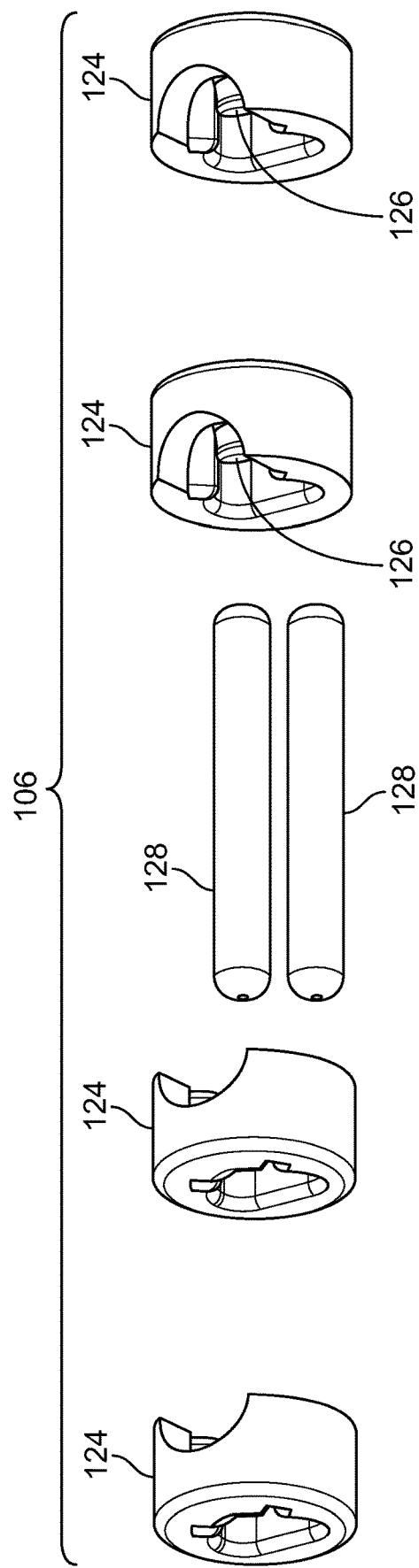
FIG. 14 is an exploded view of the optical splice arrangement of FIG. 11.

An important aspect of the optical splice arrangement 106 is that the optical splice arrangement 106 does not substantially alter normal bending of the optical fibers. One reason the optical splice arrangement 106 does not substantially alter normal bending of the optical fibers is that the optical splice arrangement 106 is relatively short in length. One example, of the optical splice arrangement 106 has a length less than or equal to 10 millimeters (mm). In another example, the length L (see FIG. 11) of the optical splice arrangement 106 is less than or equal to 7.5 mm. In still another example, the length L of the optical splice arrangement 106 is less than or equal to 6 mm or less than or equal to 5 mm and/or the optical splice arrangement 106 has a weight less than or equal to 25 milligrams, or less than or equal to 22 milligrams, or less than or equal to 20 milligrams, or less than or equal to 18 milligrams.

Another reason the optical splice arrangement 106 does not substantially affect the normal bending of the first and second optical fibers is that the optical splice arrangement 106 is relatively light. Because the optical splice arrangement 106 is relatively light, the weight of the optical splice arrangement 106 does not cause meaningful deformation or bending of the optical fibers. The light weight of the optical splice arrangement 106 also inhibits substantial loading caused by vibrations or other accelerations from being applied to the optical fibers.

Thus, for certain applications, the optical splice arrangement 106 can be installed or positioned in a free-floating configuration in which the optical splice arrangement 106 is not fixated to another structure such as a connector housing or a splice tray. In certain examples, the weight of the optical splice arrangement 106 is supported by the natural elastic characteristics of the optical fibers.

In certain examples, the optical splice arrangement 106 has a weight that is less than a spring force corresponding to elastic bending characteristics of the optical fibers. In other examples, the optical splice arrangement 106 has a weight that is less than a spring force generated by the inherent elastic bending characteristics of the spliced optical fibers when the optical spiced optical fibers are bent at their minimum bend radius.

In certain examples, the splicing station 24 can include a storage arrangement 110 positioned on a top surface 112 of the handle member 26. The storage arrangement 110 can define a first cavity 114 and a second cavity 116 that is separate from the first cavity 114. In the depicted example, the first and second cavities 114, 116 are positioned adjacent to the optical splice arrangement 106 when the optical splice arrangement 106 is positioned at the optical splice region 104, although alternatives are possible. The first cavity 114 can be configured to receive a first component and the second cavity 116 can be configured to receive a second component that is different from the first component, although alternatives are possible. In one example, the first component can be an epoxy, light curable adhesive (e.g., ultraviolet light curable adhesive), thermo-form adhesive, thermo-set adhesive, index-matching adhesive or other adhesives) and the second component can be an index matching gel, although alternatives are possible.

It will be appreciated that the storage arrangement 110 can contain multiple different types of components for providing different functions within the splice housing 108. For example, the index matching gel can be provided within the splice housing 108 on an optical path between the optical fiber ends to provide optical coupling between the optical fibers, and the splice housing 108 can also contain an epoxy, light curable adhesive that can be used along the optical fibers to mechanically fixate/couple the optical fibers within the splice housing 108. The epoxy, light curable adhesive may be cured by exposure to a light source 118 (e.g., UV LED). The light source 118 can be disposed in the optical splice region to shine towards the optical splice arrangement 106. The optical splice region 104 includes entry openings 120, 122 dimensioned for passage of optical fibers therethrough for routing into the splice housing 108 of the optical splice arrangement 106 while the optical splice arrangement 106 is mounted at the optical splice region 104.

FIGS. 11-14 illustrate the example optical splice arrangement 106 in accordance with the principles of the present disclosure. The splice housing 108 is formed by a plurality of housing segments 124 that are connected end-to-end. Each of the housing segments 124 includes at least one flexible cantilever arm 126 having a base end that is unitarily formed with a main body of its corresponding housing segment 124. Alignment rods 128 are mounted within the splice housing 108. The alignment rods 128 define a fiber alignment groove 130 in which the optical fibers are received to co-axially align the optical fibers. Free ends of the cantilever arms 126 are adapted to press the optical fibers into the fiber alignment groove 130. As described above, the splice housing 108 can also be filled with adhesive for encapsulating the optical fibers. Further details regarding structural features of an optical splice arrangement can be found at PCT Patent Application Serial No. PCT/EP2017071330, which has been incorporated by reference in its entirety.

The splicing station 24 can include one or more manual control devices 132 (e.g., button, switch, toggle, etc.), although alternatives are possible. In the example depicted, a plurality of manual control devices 132 are shown positioned on the top surface 112 of the handle member 26. The plurality of manual control devices 132 can be arranged and configured to interface with an operating device 134 (e.g., pumps, valves, nozzles, active device, or other structure for controlling the injection of flowable material, such as, adhesive and/or index matching gel.)

Figure 9:
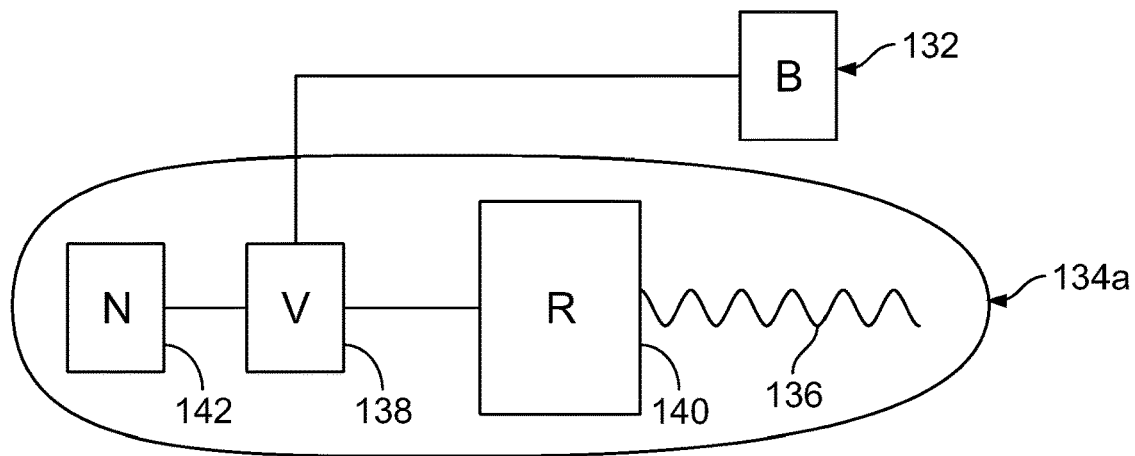
FIG. 9 is a schematic illustration of an example operating device in accord with the principles of the present disclosure.

FIG. 9 depicts an example operating device 134a that can interface with the manual control device 132 for controlling the adhesive and/or the index matching gel. The operating device 134a includes a spring 136 that can help to dispense the adhesive and/or index matching gel. The spring 136 can act as a source of pressure to dispense the adhesive and/or index matching gel upon actuation of the manual control device 132 (e.g., pressing a button, moving a switch, etc.) that opens a valve 138 for dispensing the desired material (e.g., adhesive and/or index matching gel). In other examples, a pump may be used to generate pressure to move the adhesive and/or index matching gel or a weight load may be used that generates force for applying pressure.

The operating device 134a may include a reservoir 140 (e.g., cartridge, bag, canister, container) for containing the adhesive or index matching gel. In certain examples, the reservoir 140 may be replaceable and air sealed. In other examples, the reservoir 140 may be collapsible. The operating device 134a may also include one or more nozzles of injection ports 142 for injecting flowable material (e.g., adhesive, index matching gel, etc.) into the optical splice arrangement 106 (e.g., mechanical alignment package). In certain examples, the optical splice arrangement 106 can be held in position at the optical splice region 104 by a fixture (e.g., clamp, spring, etc.) to ensure that the optical splice arrangement 106 remains aligned with the optical fibers during splicing.

Figure 10:
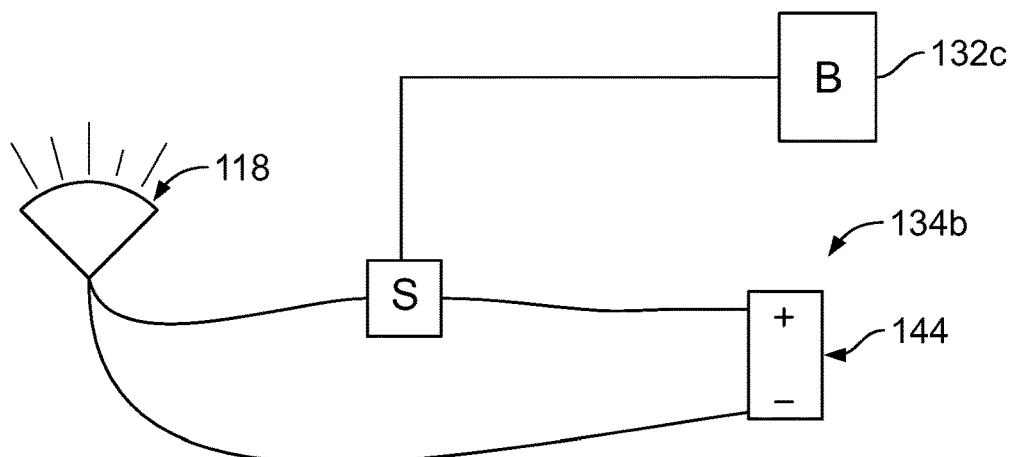
FIG. 10 is a schematic illustration of another example operating device in accord with the principles of the present disclosure.

FIG. 10 depicts another example operating device 134b that can interface with the third manual control device 132c to control the light source 118. A power source 144 can be in circuit with the third manual control device 132c to enable proper operation thereof.

In certain examples, the splicing station 24 can have an electronic controller (not shown) that interfaces with the operating device 134 (e.g., buttons, pumps, valves, nozzles, etc.). The electronic controller can be arranged and configured to function as a timer to control, for example, how long a valve remains open, or how long the light source 118 stays on, although alternatives are possible.

The plurality of manual control devices 132 can include a first manual control device 132a, a second manual control device 132b, and a third manual control device 132c. The first, second, and third manual control devices 132a, 132b, 132c are each depicted as push buttons, although alternatives are possible. For example, the first, second, and third manual control devices 132a, 132b, 132c can each be a toggle, rotary style switch, flip switch, slide switch or the like.

The first manual control device 132a can be arranged and configured to apply index matching gel, the second manual control device 132b can be arranged and configured to apply epoxy, light curable adhesive, and the third manual control device 132c can be arranged and configured to activate the light source 118. In use, the tool 16 can be held in the hand of a user, with the hand gripping the handle member 26 and a finger of the hand can actuate any one of the first, second, and/or third manual control devices 132a, 132b, 132c to either open a valve to effect dispensing of the first and second components contained within respective first and second cavities 114, 116 or to activate the light source 118. Upon actuation of the first and second manual control devices, 132a, 132b, the first and second components can be respectively dispensed from the first and second cavities 114, 116 to flow into the splice housing 108 to respectively provide optical coupling between optical fibers and/or to mechanically fixate/couple optical fibers within the splice housing 108.

Turning again to FIG. 7, the handle member has a bottom surface 146 that can define an opening (not shown) for receiving the power source 144 such as a battery or other power supply. The power source 144 can be in circuit with the first, second, third manual control devices 132a, 132b, 132c to enable proper operation thereof. As such, the power source 144 can be configured, in use, to power the first, second, third manual control devices 132a, 132b, 132c.

Another aspect of the present disclosure relates to a method of splicing and storing optical fiber in an optical fiber management system. The method includes the steps of attaching a tool assisted tray with a splicing station to a groove plate, the tool assisted tray being adapted to route optical fiber about a desired routing path; adhering the optical fiber to a substrate positioned on the tool assisted tray; splicing together fiber ends of first and second optical fibers routed on the substrate; inserting the substrate into a substrate mounting location defined by the groove plate; and removing the tool assisted tray from the groove plate such that the substrate including the spliced optical fiber remains mounted within the substrate mounting location.

The tools 16, 16a of the present disclosure provides many advantages over conventional storage arrangements. For example, the tools 16, 16a take all the complexity out of fiber organizers or trays and provides for a simple, easy way to manage optical fibers on thinner, less bulky trays or other substrates/structures. The trays or other substrates/structures can be flexible and customizable for resealing to customer's needs. Thus, no additional, complex modules are necessary. The trays or other substrates/structures can be mixed and various types of fibers can be used such that it becomes easy to switch layouts. The optical fiber management system 10 can be used with all optical fiber markets, closures, boxes, and centers.

The present disclosure relates to various concepts that can each be related together. The advantageous tool can be practiced with one or more of the following: a splicing station, a spool, a groove plate; a substrate; fiber management device; flexible organizers; an optical fiber management system, or it can be practiced separately as desired.

The advantageous fiber management device can be practiced with one or more of the following: a splicing station, a spool, a tool; flexible organizers; an optical fiber management system, or it can be practiced separately as desired.

The advantageous optical fiber management system substrate can be practiced with one or more of the following: a splicing station, a spool, a groove plate; a substrate; fiber management device; a tool; flexible organizers, or it can be practiced separately as desired.

The advantageous flexible organizers can be practiced with one or more of the following: splicing station, a spool, a groove plate; a substrate; fiber management device; a tool; optical fiber management system, or it can be practiced separately as desired.

While systems described herein have included bases such as groove plates for allowing fiber management substrates to be grouped together, aspects of the present disclosure are also applicable to systems having single fiber management substrates.

Some Selected Characterizations

The following characterizations are indicative of features and techniques according to the present disclosure that relate to: a splicing station, a spool, a groove plate; a substrate; a fiber management device; a tool; and flexible organizers; a method of splicing and storing optical fiber in an optical fiber management system; and a method of using a tool for storing optical fiber. In this summary, some selected summary characterizations of the teachings herein are provided. The list of characterizations is not meant to be exhaustive. 1. An optical fiber management system characterized by: a substrate for managing an optical fiber; a tool for assisting in routing the optical fiber along a desired routing path on the substrate, the tool being removable from the substrate after fiber routing. 2. The optical fiber management system of characterization 1 wherein: the tool is more rigid and robust than the substrate. 3. The optical fiber management system of any of the above characterizations wherein: the tool includes a spool about which the optical fiber can be coiled. 4. The optical fiber management system of any of the above characterizations wherein: the spool includes a curved portion having a radius equal to or greater than a minimum bend radius of the optical fiber. 5. The optical fiber management system of any of the above characterizations wherein: the spool has a shape selected from the group including a cylinder, a race-track, and oval, an ellipse, an obround shape, and a shape having curved ends separated by spaces. 6. The optical fiber management system of any of the above characterizations wherein: the tool includes a tray including a fiber containment wall or walls for containing the optical fiber. 7. The optical fiber management system of any of the above characterizations, wherein the spool mounts on the tray. 8. The optical fiber management system of any of the above characterizations wherein: the tool includes a fiber routing region defined between the spool and the fiber containment wall or walls of the tray. 9. The optical fiber management system of any of the above characterizations wherein: the portion of the optical fiber routed and managed on the substrate includes an optical splice. 10. The optical fiber management system of any of the above characterizations wherein: the substrate has a flexible construction. 11. The optical fiber management system of claim of the above characterizations wherein: the substrate has inherent flexibility that allows the substrate to be flexed like a living hinge. 12. The optical fiber management system of any of the above characterizations wherein: the substrate includes a flexible sheet. 13. The optical fiber management system of any of the above characterizations wherein: the substrate includes a flexible polymeric sheet. 14. The optical fiber management system of any of the above characterizations wherein: the substrate includes a bottom substrate layer and an adhesive layer is provided on the bottom substrate layer for holding the routed optical fiber on the bottom substrate layer. 15. The optical fiber management system of any of the above characterizations wherein: the substrate includes a top substrate layer that affixes to the bottom layer via the adhesive with the routed optical fiber secured between the top and bottom substrate layers. 16. The optical fiber management system of any of the above characterizations wherein: the adhesive is a pressure sensitive adhesive having a bond strength strong enough to hold the bottom and top substrate layers together during storage of the optical fiber, and weak enough to allow the bottom and top substrate layers to be pulled apart to allow the routed optical fiber to be accessed. 17. The optical fiber management system of any of the above characterizations wherein: the routed optical fiber can include excess fiber length that is stored for use in later optical splicing, or the routed optical fiber can include fibers that have been spliced together where the substrate assists in storing/managing the optical fibers and in protecting the splice location. 18. The optical fiber management system of any of the above characterizations wherein: the spool is secured to the tray. 19. The optical fiber management system of any of the above characterizations wherein: the spool is secured to the tray be a detachable connection. 20. The optical fiber management system of any of the above characterizations wherein: the spool is secured to the tray by a snap-fit connection. 21. The optical fiber management system of any of the above characterizations wherein: the tray includes a substrate support surface for supporting the substrate during fiber routing. 22. The optical fiber management system of any of the above characterizations wherein: the substrate support surface surrounds the spool and is positioned between the spool and the fiber containment wall or walls. 23. The optical fiber management system of any of the above characterizations wherein: the substrate defines an opening for receiving the spool such that the spool can be removed from the substrate after fiber routing. 24. The optical fiber management system of any of the above characterizations wherein: the system includes a plurality of the substrates that attach to a base. 25. The optical fiber management system of any of the above characterizations wherein: the base defines a plurality of substrate mounting locations for mounting the substrates in a stacked/overlapping configuration. 26. The optical fiber management system of any of the above characterizations wherein: the substrates have flexible constructions that provide the substrates with inherent flexibility that allows the substrates to flex/pivot in a living hinge manner at least 45, 90, 135, or 180 degrees relative to the base to allow the substrates to be individually accessed. 28. The optical fiber management system of any of the above characterizations wherein: the substrates include tabs that interface with the base. 29. The optical fiber management system of any of the above characterizations wherein: the based includes a groove plate having grooves for routing optical fibers to different spaced-apart substrate mounting locations. 30. The fiber management system of any of the above characterizations wherein: the tray couples to the base by a detachable mechanical coupling interface. 31. A fiber management device characterized by: a base having substrate attachment locations; and fiber management substrates that attach to the substrate attachment locations of the base, the fiber management substrates having flexile constructions that allow the substrates to flex through a range of movement relative to the base that includes at least 45 degrees. 32. In an optical fiber management system of any of the above characterizations, a method of storing optical fiber in an optical fiber management system, characterized by the steps of: attaching a tool assisted tray to a groove plate, the tool assisted tray being adapted to route optical fiber about a desired routing path; adhering the optical fiber to a substrate positioned on the tool assisted tray; inserting the substrate into a substrate mounting location defined by the groove plate; and removing the tool assisted tray from the groove plate such that the substrate including the optical fiber remains mounted within the substrate mounting location. 33. In optical fiber management system of any of the above characterizations, a method of using a tool assisted tray for storing optical fiber, characterized by the steps of: inserting a spool into a cut-out portion defined by the tool assisted tray, the tool assisted tray including a tray member with a fiber containment wall; inserting a first substrate onto the tray of the removable tool, the first substrate defining an opening to receive the spool upon insertion, the first substrate having a first surface and an opposite second surface such that the second surface of the first substrate contacts the tray; routing ends of an optical fiber through a groove panel; routing excess fiber around the spool and onto the first surface of the first substrate, the first surface having an adhesive applied thereon for securing the optical fiber; joining a second substrate to the first substrate such that the optical fiber is sandwiched between the first and second substrates; mounting the first and second substrates together on the groove panel using the tool assisted tray; and removing the tool assisted tray from the groove panel once the first and second substrates are attached to the groove panel. 34. An optical fiber management system characterized by: a substrate for managing an optical fiber; a tool for assisting in routing the optical fiber along a desired routing path on the substrate; and a splicing station disposed on the tool for facilitating splicing together first and second optical fibers routed and managed on the substrate; the tool being removable from the substrate after one of fiber routing and splicing. 35. The optical fiber management system of characterization 34 wherein: the tool includes a tray member and a handle member that extends from the tray member, and wherein the tray member includes a fiber containment wall for containing the optical fiber. 36. The optical fiber management system of any of the above characterizations 34-35 wherein: the splicing station includes an optical splice region along the fiber containment wall of the tray member for receiving an optical splice arrangement. 37. The optical fiber management system of any of the above characterizations 34-36 wherein: the splicing station includes a storage arrangement on an upper surface of the handle member. 38. The optical fiber management system of any of the above characterizations 34-37 wherein: the storage arrangement defines first and second cavities positioned adjacent the optical splice region. 39. The optical fiber management system of any of the above characterizations 34-38 wherein: the handle member has a lower surface that defines an opening for receiving a power source. 40. The optical fiber management system of any of the above characterizations 34-39 wherein: the splicing station includes a plurality of manual control devices positioned on the upper surface of the handle member. 41. The optical fiber management system of characterization 39 wherein: the splicing station includes first, second, and third manual control devices positioned on the upper surface of the handle member. 42. The optical fiber management system of any of the above characterizations 34-41 wherein: an epoxy, light curable adhesive is contained within the first cavity. 43. The optical fiber management system of any of the above characterizations 34-42 wherein: an index matching gel is contained within the second cavity. 44. The optical fiber management system of any of the above characterizations 34-43 wherein: the splicing station includes a light source disposed in the optical splice storage region, the light source being disposed to shine towards the optical splice arrangement. 45. The optical fiber management system of characterization 40 wherein: the power source is a battery that is in circuit with the plurality of manual control devices. 46. The optical fiber management system of characterization 41 wherein: the first, second, and third manual control devices are buttons. 47. The optical fiber management system of characterization 42 wherein: the first manual control device is configured in use to apply the index matching gel. 48. The optical fiber management system of characterization 43 wherein: the second manual control device is configured in use to apply the epoxy, light curable adhesive. 49. The optical fiber management system of characterization 44 wherein: the third manual control device is configured in use to activate the light source. 50. The optical fiber management system of characterization 49 wherein: the light source is a LED light source. 51. The optical fiber management system of characterization 45 wherein: the power source is configured in use to power the plurality of manual control devices. 52. The optical fiber management system of any of the above characterizations 34-51 wherein: the tool is more rigid and robust than the substrate. 53. The optical fiber management system of any of the above characterizations 34-52 wherein: the tool includes a spool about which the optical fiber can be coiled. 54. The optical fiber management system of any of the above characterizations 34-53 wherein: the spool includes a curved portion having a radius equal to or greater than a minimum bend radius of the optical fiber. 55. The optical fiber management system of any of the above characterizations 34-54 wherein: the spool mounts on the tray. 56. The optical fiber management system of any of the above characterizations 34-55 wherein: the system includes a plurality of the substrates that attach to a base. 57. In an optical fiber management system of any of the above characterizations 34-56, a method of storing optical fiber in an optical fiber management system, characterized by the steps of: attaching a tool assisted tray to a groove plate, the tool assisted tray being adapted to route optical fiber about a desired routing path; adhering the optical fiber to a substrate positioned on the tool assisted tray; splicing together fiber ends of first and second optical fibers routed on the substrate; inserting the substrate into a substrate mounting location defined by the groove plate; and removing the tool assisted tray from the groove plate such that the substrate including the optical fiber remains mounted within the substrate mounting location. 58. In optical fiber management system of characterization 57, further comprising the steps of: applying an index matching gel between the fiber ends; and applying a curable adhesive to secure the first and second optical fibers.

Herein in the context of characterization of claims that follow in the section titled "What Is Claimed Is," the phrase "of any of the above claims" means that any selected one of the claims can be used and it is not necessary that all of the details of all the claims must be used. The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. An optical fiber management system comprising:
   a substrate for managing an optical fiber; and
   a tool for assisting in routing the optical fiber along a desired routing path on the substrate, the tool being removable from the substrate after fiber routing;
   wherein the substrate has a flexible construction that includes a flexible polymeric sheet.

2. The optical fiber management system of claim 1, wherein the tool is more rigid and robust than the substrate.

3. The optical fiber management system of claim 1, wherein the tool includes a spool about which the optical fiber can be coiled.

4. The optical fiber management system of claim 3, wherein the spool has a shape selected from the group including a cylinder, a race-track, an oval, an ellipse, an obround shape, and a shape having curved ends separated by spaces.

5. The optical fiber management system of claim 1, wherein the tool includes a tray including a fiber containment wall or walls for containing the optical fiber.

6. The optical fiber management system of claim 5, wherein a spool mounts on the tray.

7. The optical fiber management system of claim 6, wherein the tool includes a fiber routing region defined between the spool and the fiber containment wall or walls of the tray.

8. The optical fiber management system of claim 6, wherein the spool is secured to the tray by a detachable connection.

9. The optical fiber management system of claim 6, wherein the tray includes a substrate support surface for supporting the substrate during fiber routing.

10. The optical fiber management system of claim 9, wherein the substrate support surface surrounds the spool and is positioned between the spool and the fiber containment wall or walls.

11. The optical fiber management system of claim 1, wherein the substrate has inherent flexibility that allows the substrate to be flexed like a living hinge.

12. The optical fiber management system of claim 1, wherein the substrate includes a bottom substrate layer and an adhesive layer is provided on the bottom substrate layer for holding the routed optical fiber on the bottom substrate layer.

13. The optical fiber management system of claim 12, wherein the substrate includes a top substrate layer that affixes to the bottom substrate layer via the adhesive layer with the routed optical fiber secured between the top and bottom substrate layers.

14. The optical fiber management system of claim 13, wherein the adhesive layer is a pressure sensitive adhesive having a bond strength strong enough to hold the bottom and top substrate layers together during storage of the optical fiber, and weak enough to allow the bottom and top substrate layers to be pulled apart to allow the routed optical fiber to be accessed.

15. The optical fiber management system of claim 1, wherein the routed optical fiber can include excess fiber length that is stored for use in later optical splicing, or the routed optical fiber can include fibers that have been spliced together where the substrate assists in storing/managing the optical fibers and in protecting the splice location.

16. The optical fiber management system of claim 1, wherein the system includes a plurality of the substrates that attach to a base.

17. The optical fiber management system of claim 16, wherein the base defines a plurality of substrate mounting locations for mounting the plurality of substrates in a stacked/overlapping configuration.

18. The optical fiber management system of claim 17, wherein the plurality of substrates have constructions that include flexible sheets.

19. The optical fiber management system of claim 18, wherein the base includes a groove plate having grooves for routing optical fibers to different spaced-apart substrate mounting locations.

20. The fiber management system of claim 16, wherein the tool couples to the base by a detachable mechanical coupling interface.

21. An optical fiber management system comprising:
a substrate for managing an optical fiber; and
a tool for assisting in routing the optical fiber along a desired routing path on the substrate, the tool being removable from the substrate after fiber routing;
wherein the substrate includes a bottom substrate layer and an adhesive layer is provided on the bottom substrate layer for holding the routed optical fiber on the bottom substrate layer.

22. The optical fiber management system of claim 21, wherein the substrate includes a top substrate layer that affixes to the bottom substrate layer via the adhesive layer with the routed optical fiber secured between the top and bottom substrate layers.

23. The optical fiber management system of claim 22, wherein the adhesive layer is a pressure sensitive adhesive having a bond strength strong enough to hold the bottom and top substrate layers together during storage of the optical fiber, and weak enough to allow the bottom and top substrate layers to be pulled apart to allow the routed optical fiber to be accessed.

24. An optical fiber management system comprising:
a substrate for managing an optical fiber; and
a tool for assisting in routing the optical fiber along a desired routing path on the substrate, the tool being removable from the substrate after fiber routing;
wherein the tool includes a tray including a fiber containment wall or walls for containing the optical fiber; and
wherein a spool mounts on the tray.

25. The optical fiber management system of claim 24, wherein the tool includes a fiber routing region defined between the spool and the fiber containment wall or walls of the tray.

26. The optical fiber management system of claim 24, wherein the spool is secured to the tray by a detachable connection.

27. The optical fiber management system of claim 24, wherein the tray includes a substrate support surface for supporting the substrate during fiber routing.

28. The optical fiber management system of claim 27, wherein the substrate support surface surrounds the spool and is positioned between the spool and the fiber containment wall or walls.

* * * * *